(12) United States Patent
Darum

(10) Patent No.: US 9,557,743 B2
(45) Date of Patent: Jan. 31, 2017

(54) MODULAR SMOKE VENTILATION SYSTEM WITH SERIAL CONTROL POINTS

(71) Applicant: VKR HOLDING A/S, Hørsholm (DK)

(72) Inventor: Jesper Darum, Brøndby (DK)

(73) Assignee: Windowmaster A/S, Vedbaek (DK)

( * ) Notice: Subject to any disclaimer, the term of this patent is extended or adjusted under 35 U.S.C. 154(b) by 112 days.

(21) Appl. No.: 14/375,825

(22) PCT Filed: Feb. 21, 2013

(86) PCT No.: PCT/DK2013/050046
§ 371 (c)(1),
(2) Date: Jul. 31, 2014

(87) PCT Pub. No.: WO2013/123948
PCT Pub. Date: Aug. 29, 2013

(65) Prior Publication Data
US 2014/0379140 A1 Dec. 25, 2014

(30) Foreign Application Priority Data

Feb. 22, 2012 (DK) .................................. 2012 70084

(51) Int. Cl.
*G05D 7/06* (2006.01)
*F24F 11/00* (2006.01)

(52) U.S. Cl.
CPC ............. *G05D 7/06* (2013.01); *F24F 11/0001* (2013.01); *F24F 11/006* (2013.01); *F24F 2011/0097* (2013.01)

(58) Field of Classification Search
CPC ....... G05D 7/06; F24F 11/0001; F24F 11/006; F24F 2011/0097
See application file for complete search history.

(56) References Cited

U.S. PATENT DOCUMENTS 5,433,660 A * 7/1995 Ohba ................. B60H 1/00428
454/141
5,449,987 A * 9/1995 McMillan ............... E05F 15/71
318/266
(Continued)

FOREIGN PATENT DOCUMENTS

DE 19507407 A1 9/1995
DE 19647823 A1 5/1998
(Continued)

OTHER PUBLICATIONS

Japanese Patent Application No. 2014-558000, Office Action mailed on Apr. 1, 2015, 11 pages (5 pages for the original document and 6 pages for the English translation).
(Continued)

*Primary Examiner* — Ramesh Patel
(74) *Attorney, Agent, or Firm* — Kilpatrick Townsend & Stockton LLP

(57) ABSTRACT

A smoke ventilation system comprising a system controller connected to window actuators of different building areas, and control points associated with the window actuators of different building areas, the system controller comprises a power supply module powering the window actuators and the control points, wherein the control points are connected to the system controller by a common serial bus comprising power supply and communication lines for communicating serial control signals to activate the associated window actuators of a building area.

11 Claims, 2 Drawing Sheets

(56) References Cited

U.S. PATENT DOCUMENTS

Figure 1:
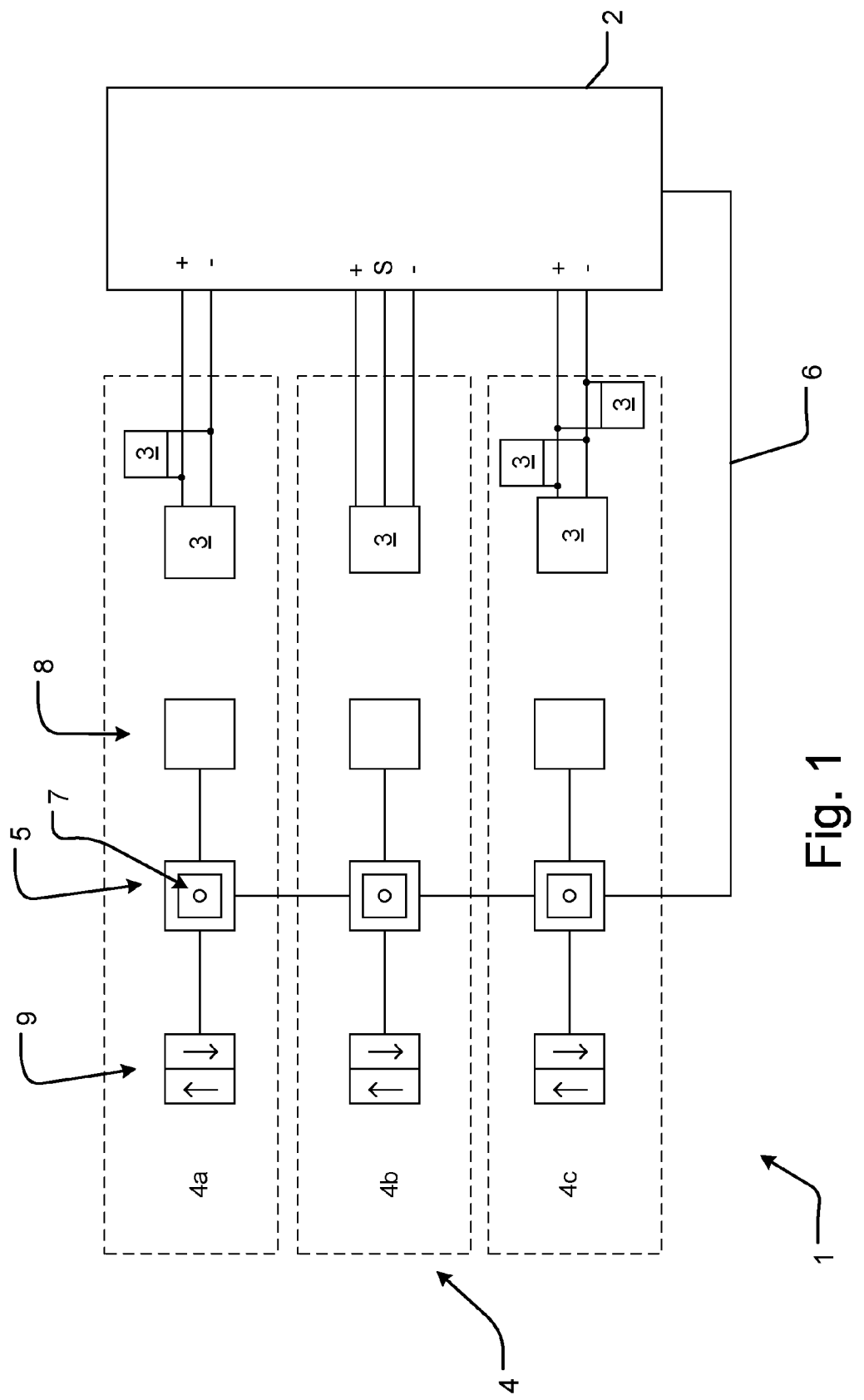

| | | | | | |
|---|---|---|---|---|---|
| 5,453,738 | A | * | 9/1995 | Zirkl | G08C 19/28 307/40 |
| 5,476,132 | A | * | 12/1995 | Jacobson | E06B 9/368 160/168.1 V |
| 5,788,571 | A | * | 8/1998 | Ivison | F24F 7/06 454/249 |
| 6,776,708 | B1 | * | 8/2004 | Daoutis | F24F 7/06 454/229 |
| 7,005,994 | B2 | | 2/2006 | King | G08B 29/183 340/506 |
| 7,119,700 | B2 | * | 10/2006 | Rotta | B64D 45/00 165/235 |
| 7,468,591 | B2 | * | 12/2008 | Bruno | E06B 9/80 318/266 |
| 7,508,313 | B2 | * | 3/2009 | Cole | G01N 21/53 340/628 |
| 7,777,640 | B2 | * | 8/2010 | Emilsson | G08B 3/06 340/384.1 |
| 2004/0209566 | A1 | * | 10/2004 | Caliendo | A62C 2/247 454/156 |
| 2005/0209710 | A1 | | 9/2005 | Andersen | |
| 2006/0154596 | A1 | | 7/2006 | Meneely | |
| 2008/0182506 | A1 | * | 7/2008 | Jackson | F24F 11/0017 454/354 |
| 2008/0197204 | A1 | * | 8/2008 | Whitney | A62C 99/00 236/51 |
| 2012/0318878 | A1 | * | 12/2012 | Park | F24F 11/0001 236/49.2 |
| 2013/0029580 | A1 | * | 1/2013 | Furrer | G05B 19/0428 454/239 |
| 2014/0287673 | A1 | * | 9/2014 | Darum | F24F 11/02 454/254 |

FOREIGN PATENT DOCUMENTS

| | | |
|---|---|---|
| DE | 102007011428 A1 | 9/2007 |
| EP | 0695918 A1 | 2/1996 |
| EP | 2383401 A2 | 11/2011 |
| JP | H06197996 A | 7/1994 |
| JP | H07114681 A | 5/1995 |
| JP | H07121781 A | 5/1995 |
| JP | H10040477 A | 2/1998 |
| JP | 2000113356 A | 4/2000 |
| JP | 2002352365 A | 12/2002 |
| JP | 2009144435 A | 7/2009 |
| WO | 2010047606 A1 | 4/2010 |

OTHER PUBLICATIONS

Danish Patent Application No. PA 2012 70084, Danish Search Report mailed Oct. 4, 2012, 1 page.
International Search Report dated Aug. 8, 2013 in Application No. PCT/DK2013/050046.
International Preliminary Report on Patentabiiity dated Mar. 3, 2014 in Application No. PCT/DK2013/050046.

* cited by examiner

MODULAR SMOKE VENTILATION SYSTEM WITH SERIAL CONTROL POINTS

The present invention relates to a smoke ventilation system comprising a system controller connected to window actuators of different building areas, and control points associated with the window actuators of different building areas, the system controller comprises a power supply module powering the window actuators and the control points.

Smoke ventilation systems are provided to lead smoke and heat out of a burning building so that escape routes for people in the building and access roads to the building are kept free of smoke in case of a fire in the building. Such systems typically comprise a central system controller with a power supply powering a plurality of window actuators for opening and closing of windows in different areas of a building and control points associated with the different areas of the building. In case of fire the window actuators may be activated by a control point comprising activation means such as a push button to be activated manually or automatic fire and smoke detector. By activation the control points communicate a control signal to the system controller so that the windows may be opened and closed in order to control smoke with access roads to the building and emergency exit routes inside the building.

The system controller is connected to the control points and window actuators in a star topology, i.e. with separate connections to each control point and window actuator, and therefore the required cabling is costly both in terms of labour and materials. Moreover, the association of a control points to a building area is determinate by the actual termination of connecting power supply and communication lines in the system controller, which require a port for the termination of each power supply and communication line.

Therefore it is an object of the present invention to provide a more simple smoke ventilation system as to configuration and installation.

With a view to this the present invention is characterized in that the control points are connected to the system controller by a common serial bus comprising power supply and communication lines for communicating serial control signals to activate the associated window actuators of a building area.

By connecting the control points to the system controller by a common serial bus the amount of cabling required to provide the power supply lines and communication lines is significantly reduced. Also the number of ports required in the system controller for connecting the control points with the system controller is reduced, which provides for larger systems with more control points.

When the control points are connected by a common serial bus to the system controller it is not the physical connection of the communication line to the system controller that determines the function and association of the control point to the window actuators of a building areas. This makes the system more flexible as to addition of control points, which may be added to the series of control points without affecting the installation at the system controller. Instead of being determined by the physical connection, the association of the control points to different building areas may be configured by the system controller.

In a preferred embodiment at least one of the window actuators is connected to the system controller by a power supply and communication line.

In an embodiment allowing a very simple cabling at least one of the window actuators is connected to the system controller only by a 2-wire power supply line.

In a preferred embodiment the window actuators of a building area communicate status signals to the associated control points via the system controller. By communicating in both directions between the control points and the window actuators it is possible to provide an early warning to users of a building if window actuators do not function properly or a cable in the installation has been damaged. Likewise, this allows providing an indication that the system is functioning correct.

In a practical embodiment a control point comprises manual and/or automatic smoke detector.

In a further practical embodiment the control point comprises a window actuator for activating the window operators in order to provide comfort ventilation. This makes it possible to use the control points and the connection to the system controller to enable comfort ventilation.

In a preferred embodiment the system controller comprises a programming and communication module powered by the power supply module, the programming and communication module handle communication between the control points and the associated window actuators, and the association of control points to different window actuators. This makes it easier to reconfigure the functioning of a smoke ventilation system without changing the cabling at the system controller. Even when a control point is added to the series of control points, the only physical modification to the system is at the point along the power supply and communication line where the control point is added.

In a further development of the invention the system controller comprises a window actuator module wherein the window actuators are connected to the system controller.

In a further development of the invention the system controller comprises a connection module wherein the control points are connected to the system controller. A connection module is advantageous for providing connection port for connecting several system controllers in a daisy chain and for connecting several daisy chains.

In an even further development of the invention providing an even more modular configuration a plurality of system controllers are connected by a serial communication bus.

In an even further development more series of system controllers connected by a serial communication bus are connected in parallel.

Figure 2:
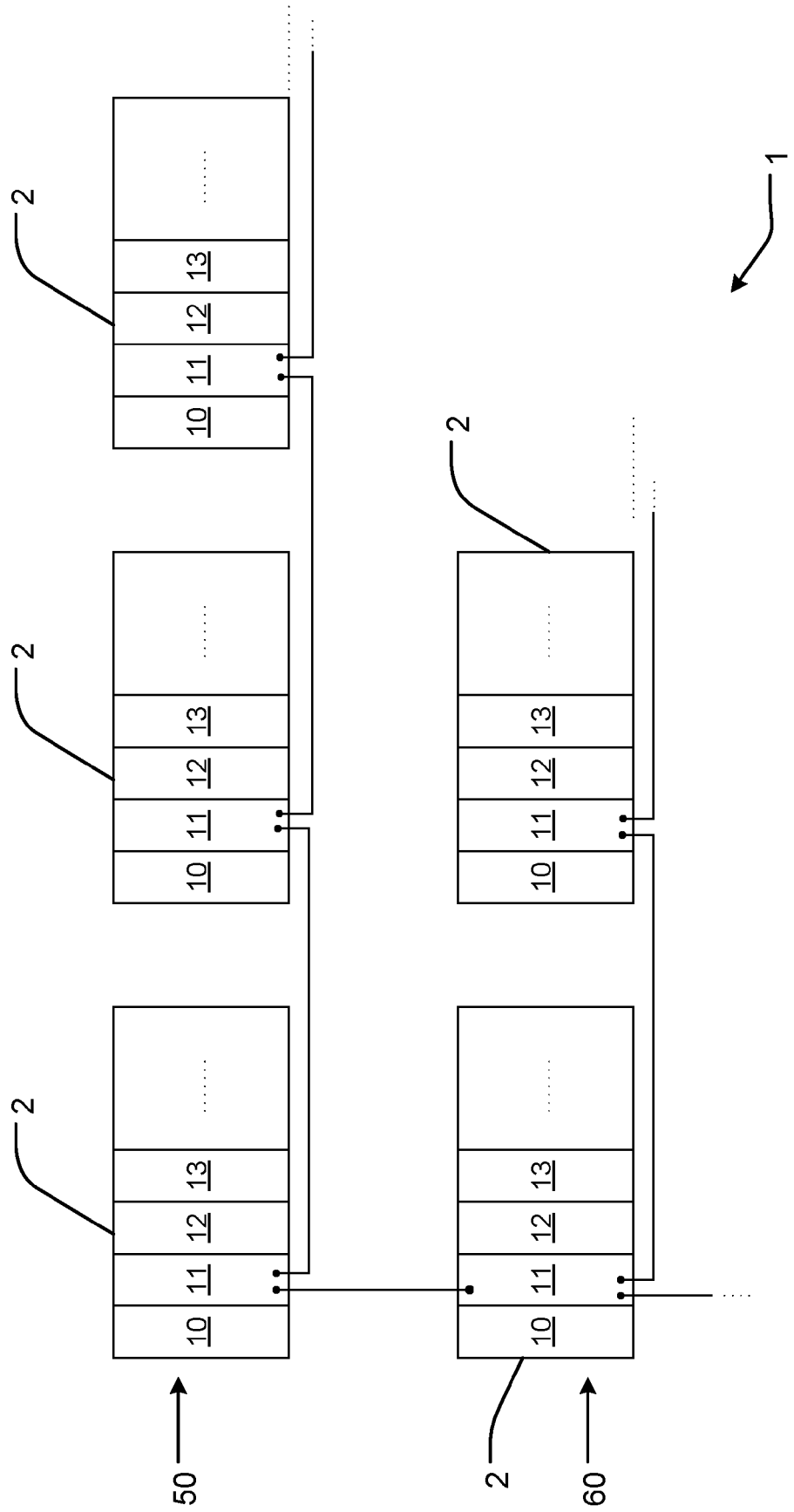

In the following, illustrative examples and embodiments of the present invention are described in further detail with reference to the preferred embodiment illustrated by the schematic drawings, on which FIG. 1 shows a smoke ventilation system according to the invention, FIG. 2 shows a series of system controllers in an embodiment of the invention.

FIG. 1 shows a smoke ventilation system 1 comprising a system controller 2 connected by individual lines to window actuators 3 of different building areas 4. The window actuators 3 are powered by the system controller 2 by power supply lines as illustrated in the right hand side of FIG. 1, i.e. with a power supply voltage such 24 V. The operation of the window actuators 3 is controlled by the system controller 2. Each building area 4 may comprise several window actuators 3 connected to the same power supply lines as illustrated with the building areas denoted 4a and 4c. A building area may be served by several pairs of power supply lines. As illustrated for the building area denoted 4b, the window actuators 3 may further be connected to the system controller 2 by a communication line via a port denoted S. In that situation a cable with at least three wires between the system controller 2 and each window actuator 3 or group of window actuators 3 is required, i.e. one wire is used for the communication line and two wires are used for the power supply lines. Hence the system controller 2 is connected to the window actuators in a star topology with several cables.

For the situation where a communication line is available, the window actuators 3 may be of the type WMU 884-2 0600 from WindowMaster®, which furthermore is configured for synchronised operation of window actuators 3 grouped in a building area. This is advantageous in case more than one window actuator 3 is required for moving a sash with respect to a frame of a window. The synchronised operation is achieved between the members of a group of window actuators enabled for synchronised operation and without involving the system controller 2, which generally control the operation of the window actuators 3 in order to open and close windows of a building area 4. In case synchronised operation is not required, the window actuator may be of the type WMU 884-1 0600 from WindowMaster®, which also is connected to the system controller 2 by two power supply lines and a communication line. The operation of window actuators 3 of the above-mentioned types is controlled by the system controller 2 via the communication line and position detectors. For instance as an end stop detector in the window actuator may be used to return a status signal to the system controller 2. Evidently, information about eventual cable breaks or failure to perform a desired operation of the window actuators is readily at hand, because a failure in the communication between the window actuators 3 and the system controller 2 will indicate a break along the cabling between the window actuators 3 and the system controller 2.

In situations illustrated with building areas 4a and 4c where only a cabling with two wires between the system controller 2 and the window actuators 3 or groups of window actuators is available, window actuators 3 configured for operation based on only the power supply lines may be deployed.

Such window actuators 3 are controlled to open and close a window by providing the supply voltage via the power supply lines for a predetermined time period allowing the window actuators to open a window. In order to close the window the supply voltage provided via the power supply lines is reversed, which will reverse the operation of the window actuator 3 so that the window may be closed. In order to be able to detect a break in the cabling to such window actuators 3 not connected to the system controller 2 by a communication line, it is well-known to provide connect an end line module to the power supply lines to obtain information about a damaged connection cable. This generally allows the system controller 2 to detect if the window actuators 3 may be controlled as desired also when a window actuator 3 only is controllable via two power supply lines, which is crucial to the safety of a smoke ventilation system.

The system controller 2 is connected to control points 5 associated with window actuators 3 of different building areas 4. Hence the control points 5 may be associated with window actuators located in for instance two neighbouring building areas. Alternatively, each of the control points is associated with window actuators of only one building area. Evidently, several control points 5 may be associated with the same building area. The control points 5 are connected to the system controller 2 via a common serial bus comprising a power supply and communication line 6 between the system controller 2 and the control points. Hence the physical connection of the control points 5 to the system controller 2 cannot be used to determine which building area a control point should be associated with. Therefore, the association of the control points to the building areas is programmed in the system controller during installation or reconfiguration of a smoke ventilation system according to the invention. The control points 5 are powered by the system controller 2 via the power supply and communication line 6, which may be provided by a cable with three wires, where one wire is used for the communication line and two wires for the power supply lines. The serial communication between the system controller 2 and the control points 5 are preferably deployed by using a LIN bus and logic addresses in order to reduce the power consumption for communication over long distances.

The control points 5 comprise a manual detector 7 such as a push button, which may be use to activate the control points 5 if a fire or smoke is detected. The control points 5 may also comprise an automatic fire or smoke detector 8, which also may activate the control points 5. When one or more control points 5 are activated a control signal is communicated in series to the system controller 2 via the communication line. The control signal enables the system controller 2 to activate operation of the window actuators 3 of the building area associated with the activated control point(s) 5 when smoke or fire is detected.

In order to enable comfort ventilation the control points 5 may further comprise a window actuator 9, which may be used to open and close the windows of a building area by communicating a control signal to the system controller 2, which, however, does not indicate to the system controller 2 that smoke or fire has been detected.

Moreover, the control points 5 may be used to indicate the status of the associated window actuators 3. As mentioned above the system controller may gather information about the present status of a connection to a window actuator or a group of window actuator. This information such as a status signal pertaining to the operation of the window actuators 3 indicating a failure in operation or a cable break may be communicated via the system controller 2 to the associated control points 5 so that a failure in the smoke ventilation system may be indicated by e.g. a flashing red light or a sound indicator. Likewise, a status signal may be used at the control points 5 to indicate that the operation of the associated window actuators 5 is as desired, e.g. by use of a green light. This two-way communication between the window actuators 3 and the control points 5 via the system controller 2 may then be used to discover a failure in the operation of the smoke ventilation system 1.

The system controller comprises a power supply module 10 connected to the power supply grid and powering the window actuators 3 and the control points 5. A programming and communication module 11 is powered by the power supply module 10. The programming and communication module 11 handle communication between the control points 5 and the associated window actuators 3. The configuration of the smoke ventilation system and the association of the control points 5 to different window actuators 3 may be performed by using a display and an input device of the programming and communication module 11 or a port for connecting a computer to the programming and communication module 11.

FIG. 2 shows a system 1 with several system controllers 2 connected in a manner to be described in more detail below. FIG. 2 further illustrates a preferred embodiment with system controller 2 comprising slots for receiving a window actuator module 12, and that further modules may be added if slots are available. Hence window actuator modules 12 is powered and controlled by the power supply module 10 and the programming and communication module 11, respectively. The cabling between a window actuator 3 or a group of window actuators is connected to the system controller 2 in a port of the window actuator module 12. The cabling between the control points 5 and the system controller is connected to the programming and communication module. Evidently, a system according to the invention may comprise more than one string of serially connected to different ports of the programming and communication module.

The possible size and configuration of a smoke ventilation system 1 according to the invention may be limited by the number of available slots for window actuator modules 12 and the number of ports available for connecting a series of control points to the system controller. However, the capacity of the power supply module 10 and not the number of ports for connecting a window actuator 3 or a group of window actuators 3 may be the limiting factor. Therefore the smoke ventilation system according to the invention is also modular in the sense that system controllers may be coupled via a serial bus as illustrated in the upper series 50 of FIG. 2. The upper series of FIG. 2 is connected in a daisy chain via the programming and communication modules 11 of each of the system controller 2. The of system controllers 2 is deployed with a serial communication bus such as a CAN bus. The configuration of a series of connected system controllers 2 is facilitated by assigning logic addresses to the individual system controllers based on the system controllers position in the series of system controllers.

To increase the modularity of the smoke ventilation system according to the invention even further, more than one series of connected system controllers 2 may be provided as illustrated by the upper series 50 and the lower series 60 of FIG. 2. The daisy chained series 50, 60 are connected in parallel via the programming and communication modules 11 of a system controller 2 of each daisy chain of system controllers. In a preferred embodiment (not shown) the system controller 2 comprises a connection module 13 with ports for connecting system controllers in a daisy chain and connecting daisy chains. The communication between two daisy chains of system controllers 2 may also be based on a serial communication bus such as a CAN bus. Since the amount of communication within a daisy chain of control points is larger than the amount of communication between daisy chains. The data rate when communicating between daisy chains may be lower than the data rate uses for communicating locally within a daisy chain.

The lower data rate required for communication between the daisy chains of system controllers 11 allows for a larger distance physical distance between the daisy chains than the physical distance distance between the system controllers 11 within a daisy chain. This is highly advantageous when providing a large building or interconnected buildings with a common smoke ventilation system.

In the above examples the system according to the invention is described with respect to a system comprising window actuators, but the system according to the invention may also be deployed solely with actuators for providing ventilation in general such as ducts, hatches and vents.

The invention claimed is:

1. A smoke ventilation system comprising a system controller connected to window actuators of different building areas, and control points associated with the window actuators of different building areas, the system controller comprises a power supply module powering the window actuators and the control points wherein the control points are connected to the system controller by a common serial bus comprising power supply and communication lines for communicating serial control signals to activate the associated window actuators of a building area.

2. The smoke ventilation system according to claim 1, wherein at least one of the window actuators is connected to the system controller by a power supply and communication line.

3. The smoke ventilation system according to claim 1, wherein at least one of the window actuators is connected to the system controller by a 2-wire power supply line.

4. The smoke ventilation system according to claim 1, wherein the window actuators of a building area communicate status signals to the associated control points via the system controller.

5. The smoke ventilation system according to claim 1, wherein a control point comprises a manual and/or automatic smoke detector.

6. The smoke ventilation system according to claim 1, wherein a control point comprises a window actuator for activating the window operators in order to provide comfort ventilation.

7. The smoke ventilation system according to claim 1, wherein the system controller comprises a programming and communication module powered by the power supply module, the programming and communication module handle communication between the control points and the associated window actuators, and the association of control points to different window actuators.

8. The smoke ventilation system according to claim 1, wherein the system controller comprises a window actuator module wherein the window actuators are connected to the system controller.

9. The smoke ventilation system according to claim 1, wherein the system controller comprises a connection module wherein to the control points are connected to the system controller.

10. The smoke ventilation system according to claim 1, wherein a plurality of system controllers are connected by a serial communication bus.

11. The smoke ventilation system according to claim 10, wherein more series of system controllers are connected by a serial communication bus in parallel.

* * * * *